United States Patent [19]
Dye

[11] Patent Number: 5,088,970
[45] Date of Patent: Feb. 18, 1992

[54] TIMING OF MULTIPLE GEAR TRAIN DIFFERENTIAL

[75] Inventor: James S. Dye, Walworth, N.Y.
[73] Assignee: Zexel-Gleason USA, Inc., Rochester, N.Y.
[21] Appl. No.: 460,131
[22] PCT Filed: Mar. 21, 1988
[86] PCT No.: PCT/US88/00853
§ 371 Date: May 25, 1990
§ 102(e) Date: May 25, 1990
[87] PCT Pub. No.: WO89/05933
PCT Pub. Date: Jun. 29, 1989

Related U.S. Application Data

[63] Continuation-in-part of PCT/US87/03320, Dec. 18, 1987.
[51] Int. Cl.$^5$ ............................ F16H 1/38; F16H 1/44
[52] U.S. Cl. ............................ 475/227; 475/226; 475/249; 475/904
[58] Field of Search ............... 475/158, 226, 227, 249, 475/251, 904

[56] References Cited

U.S. PATENT DOCUMENTS

| | | | |
|---|---|---|---|
| 2,859,641 | 11/1958 | Gleasman | 475/227 |
| 3,292,456 | 12/1966 | Saari | 475/226 |
| 3,735,647 | 5/1973 | Glaseman | 475/227 |
| 3,875,824 | 4/1975 | Benjamin | 475/158 |
| 4,750,383 | 6/1988 | Stritzel | 475/227 |
| 4,754,661 | 7/1988 | Barnett | 475/904 X |
| 4,916,978 | 4/1990 | Razelli et al. | 475/226 |
| 4,938,099 | 7/1990 | Knight | 475/226 |

FOREIGN PATENT DOCUMENTS

| | | | |
|---|---|---|---|
| 8905933 | 6/1989 | PCT Int'l Appl. | 475/227 |
| 8403748 | 9/1984 | World Int. Prop. O. | |

Primary Examiner—Allan D. Herrmann
Assistant Examiner—Khoi Q. Ta
Attorney, Agent, or Firm—Eugene Stephens & Associates

[57] ABSTRACT

A differential gear assembly of the type used in automotive and truck axles having multiple gear trains for interconnecting axle ends is provided with gearing components having a particular relationship between tooth numbers for simplifying assembly requirements of the differential. For example, each gear train includes a pair of combination gears (40, 50) formed with center worm wheel portions (42, 52) and first (44, 54) and second (46, 56) spur portions at either end. The tooth numbers $n_s$ of the spur portions (44, 54 and 46, 56) are made an integer multiple k of the tooth numbers n of the worm wheel portions (42, 52) of each combination gear (40, 50). The relationship can be expressed as follow:

$n_s = k - n$; $k > 1$ and
an integer $= 2(N \cdot k)/w$ and
N = no. of side gear teeth
W = no. of gear trains This enables the respective gear trains w to be assembled in a properly timed relationship at an expanded number of easily recognizable rotational positions.

20 Claims, 5 Drawing Sheets

TIMING OF MULTIPLE GEAR TRAIN DIFFERENTIAL

RELATED APPLICATIONS

This is a continuation-in-part of International Application No. PCT/US87/03320 filed on Dec. 18, 1987 having fulfilled requirements for a national filing of application Ser. No. 07/178744 on the same date and having been withdrawn following the filing of this application as International Application PCT/US88/00853.

TECHNICAL FIELD

The present invention relates to vehicle differential gear assemblies of the type which include a plurality of gear trains for sharing the transmission of power through the differential, and specifically, to the design of such gear trains.

Multiple gear train differential assemblies often require each gear member of the assembly to be mounted in a particular order and at a distinct rotational position. These special assembly procedures are necessary (a) to avoid interference between the gear trains which would prevent their collective assembly and (b) to ensure equal load sharing between the gear trains.

BACKGROUND ART

A differential assembly of the type contemplated for the present invention is generally of the design shown in U.S. Pat. No. 2,859,641 (GLEASMAN). This patent is incorporated herein by reference to the extent necessary to provide specific details of the structure of the differential assembly.

This type of differential includes a rotatable gear housing, a pair of drive axles received in bores formed in the sides of the housing, and a differential gear arrangement mounted within a main body portion of the housing for driving the axles. The gear housing body portion includes a flange formed at one end for mounting a ring gear or other means for providing power input to the differential from the drive shaft of the vehicle in a conventional manner. The gear housing is provided with a cap at its other end which may be formed as an integral part of the housing or may be removably secured to the housing.

The gear arrangement which is referred to as a "crossed-axis compound planetary gear complex" includes a pair of helical worm or side gears coupled to each axle end, together with so called transfer gears associated with each of the side gears and in mesh with each other for transferring and dividing torque between the axle ends. The transfer gears are mounted in pairs within slots, or windows, formed in the main body portion of the gear housing, and each transfer gear of a pair rotates on an axis of rotation that is substantially perpendicular to the axis of rotation of the side gears and gear housing.

The transfer gears are in reality combination gears, i.e., the middle portion of each gear constitutes a worm wheel portion while the outer ends of the gear are formed with integral spur gear portions. The gear arrangement is such that, for any given pair of combination gears, the worm wheel portion of a first combination gear meshes with one side gear while the worm wheel portion of a second combination gear meshes with the other side gear, and the spur gear portions of the respective combination gears mesh with each other.

In one example of this type of differential assembly, a set of three combination gears are arranged with their respective axes of rotation in a first plane at approximately 120° intervals about the periphery of each side gear, each of the three combination gears being paired with a combination gear of a second set of three combination gears similarly arranged with respect to the second side gear in a second plane parallel to the first plane.

Each of the combination gear pairs may be considered as a part of a separate gear train for interconnecting the side gears. Although it would be possible to transmit a limited amount of power between side gears using only a single gear train, one or more additional pairs of combination gears are used to define additional gear trains for increasing power transmitting capability of the differential and to provide additional frictional surfaces for dividing torque between drive axles. However, once a first gear train is used to operatively connect the side gears, relative rotational positions of the two side gears are established and additional gear trains must be assembled in a manner which preserves this established rotational relationship between side gears. Otherwise, the additional trains will not fit properly into mesh.

The relationship between the gear trains which is required to fit each gear train properly into mesh with the two side gears may be referred to as "timing." In known designs, it has been necessary to mount each combination gear in a particular order and at a distinct rotational position with respect to the other combination gears to maintain the required timing relationship between gear trains. Such particular rotational positions cannot be readily ascertained from the mere appearance of the combination gears, and the large number of possible mounting positions which do not meet the required timing requirements renders trial and error assembly procedures impractical. There is also the danger that it would be possible to fit pairs of combination gears into mesh at inexact positions which would prevent an equal sharing of loads by the different trains.

Accordingly, special assembly procedures have been used to ensure that the gear trains are properly assembled. Examples of such procedures are found in U.S. Pat. Nos. 3,849,862, 3,875,824 and 3,902,237 (all to BENJAMIN). These patents disclose special procedures for mounting the combination gears in a particular order and rotational position within the gear housing. Reference marks are placed at the same relative position on each combination gear and the reference marks are used to index the partial rotation of each combination gear by a predetermined amount with respect to the other combination gears to arrive at an exact timing relationship between the gear trains.

These procedures, however, are cumbersome and time consuming. Typically, it is necessary to identify the reference mark on each combination gear and to mount each gear in a particular rotational position and in a prescribed sequence with respect to each of the other combination gears. Different procedures may also be required for each new gear design which is used within the differential, and partial reassembly of the gear trains to replace one or more gears in the assembly poses additional problems which cannot be easily accommodated by the established procedures.

Modifications to the known differential type such as those disclosed in prior U.S. patent application Ser. No.

06/895,870 also affect the timing relationship between gear trains. The prior application discloses a gearing arrangement whereby combination gear pairs are shifted relative to each other along the axial length of the side gears to distribute contact wear over a larger area of the side gears. The shift in relative positions of combination gear pairs along the axial length of the side gears requires modifications to established assembly procedures which may further complicate the already difficult procedures.

A further gear-timing relationship is involved in this same differential gear assembly, and it relates to the common practice of indexing (i.e., rotating a predetermined proportion of a single revolution) a first spur gear portion of each combination gear with respect to the second spur gear portion of the same combination gear. This relative indexing is done to promote a smooth transmission of power between members of each combination gear pair. For example, U.S. Pat. No. 3,735,647 (GLEASMAN) discloses concentric first and second spur gear portions of each combination gear which are indexed relative to each other by predetermined amounts selected to avoid the relative position of one-half circular pitch (i.e., one-half of the circumferential distance from one gear tooth to the next). Such timing relationships associated with the relative indexing of the spur portions of each combination gear require that the two members of each combination gear pair be separately designed. For instance, if the first spur portion of one member of a combination gear pair is relatively indexed by one-quarter pitch in a clockwise direction with respect to the second spur portion of the same combination gear, then the first spur portion of the other member of the combination gear pair must be relatively indexed by one-quarter pitch with respect to its associated second spur portion in a counterclockwise direction. Since two different designs of combination gears are required in such differential assemblies, further complexity and cost is added to the manufacture and assembly of the differentials.

DISCLOSURE OF INVENTION

The present invention is directed to overcoming the above-identified problems associated with the special timing requirements of multiple gear train differential assemblies. This is in part accomplished in the present invention by designing gear members within the differential assembly with a particular relationship of tooth numbers. That is, the tooth numbers of all of the gears within the differential are selected so that the combination gears will fit properly into mesh with each other and with the side gears at each unit pitch of worm wheel position and in virtually any desired order of assembly.

One version of the improved multiple gear train assembly is designed with two specific requirements for determining appropriate tooth numbers in the gear differential. First, it is important that the number of spur gear teeth in the first and second spur portions of each combination gear is an exact multiple of the number of teeth in the worm wheel portion of the same gears. Second, it is important that the quotient of two times the quantity represented by product of the number of side gear teeth multiplied by the just-mentioned multiple of worm teeth divided by the number of gear trains is equal to an integer value.

By meeting these two requirements of the present invention, it is possible to design multiple gear trains, for crossed-axis gear complexes in differential assemblies, which may be readily assembled in a wide variety of easily recognizable rotational positions of the combination gears. The number of rotational positions in which combination gears may be assembled into the multiple gear trains is such that it is now possible to fit any desired tooth of the worm wheel portions of the combination gears into mesh with a mating side gear. It is also possible, according to the present invention, to readily replace one or more combination gears without disturbing the proper timed relationship between multiple gear trains.

The invention also achieves the same advantages when assembling the type of differential gear trains referred to above in which combination gear pairs are shifted relative to each other axially along the length of the side gears. In fact, according to the present invention the amount of offset (i.e., shift) between the combination gear pairs can be controlled to provide for a wider selection of tooth numbers which will satisfy the requirements of the present invention for simplifying the assembly of gearing within the differential.

Another important feature of the present invention provides for relatively indexing the concentric first and second spur gear portions of each combination gear by one-half circular pitch. (In the context of the present invention, the reservations expressed in U.S. Pat. No. 3,735,647 with regard to one-half pitch indexing do not appear to be applicable.) Since one-half circular pitch indexing between two concentric gear members in one direction of relative rotation (e.g., clockwise) is equivalent to the same amount of relative rotation in the opposite direction (e.g., counter-clockwise), a single design of combination gear may be used for both members of the combination gear pairs.

Yet another feature of the present invention provides for establishing a fixed relationship between the angular positions of the spur portions and the worm wheel portion of each combination gear which will permit the combination gears to be inverted with respect to their engaged positions with the side gears while maintaining the same timed relationship with each of the other combination gears. Viewed in the transverse planes (i.e., planes perpendicular to respective gear axes at the midpoint of tooth length) of the worm wheel and spur portions of a combination gear, the worm wheel teeth are angularly positioned with respect to the first and second spur portions such that radial lines passing though the center of worm wheel tooth thickness bisect the angular index between spur portions measured between radial center lines passing through the respective centers of spur tooth thickness. In other words, the spur index is evenly divided between ends at angular positions about the worm wheel portion which also evenly divide the worm wheel teeth.

This feature, in combination with the aforementioned integer multiple relationship between numbers of spur and worm wheel teeth and the one-half pitch index relationship between first and second spur portions, enables either flank of any worm wheel tooth of any combination gear of a common design to be entered into mesh in any sequence with either side gear. Thus, the present invention provides for eliminating virtually all of prior restrictions which have burdened the assembly of such differential gear complexes. It is also significant that this may be accomplished with simplified and less costly gear train designs.

These and other features and advantages will be apparent in a more detailed discussion which follows, and in that discussion, reference will be made to the accompanying drawings as briefly described below.

BEST MODE FOR CARRYING OUT THE INVENTION

Figure 1:
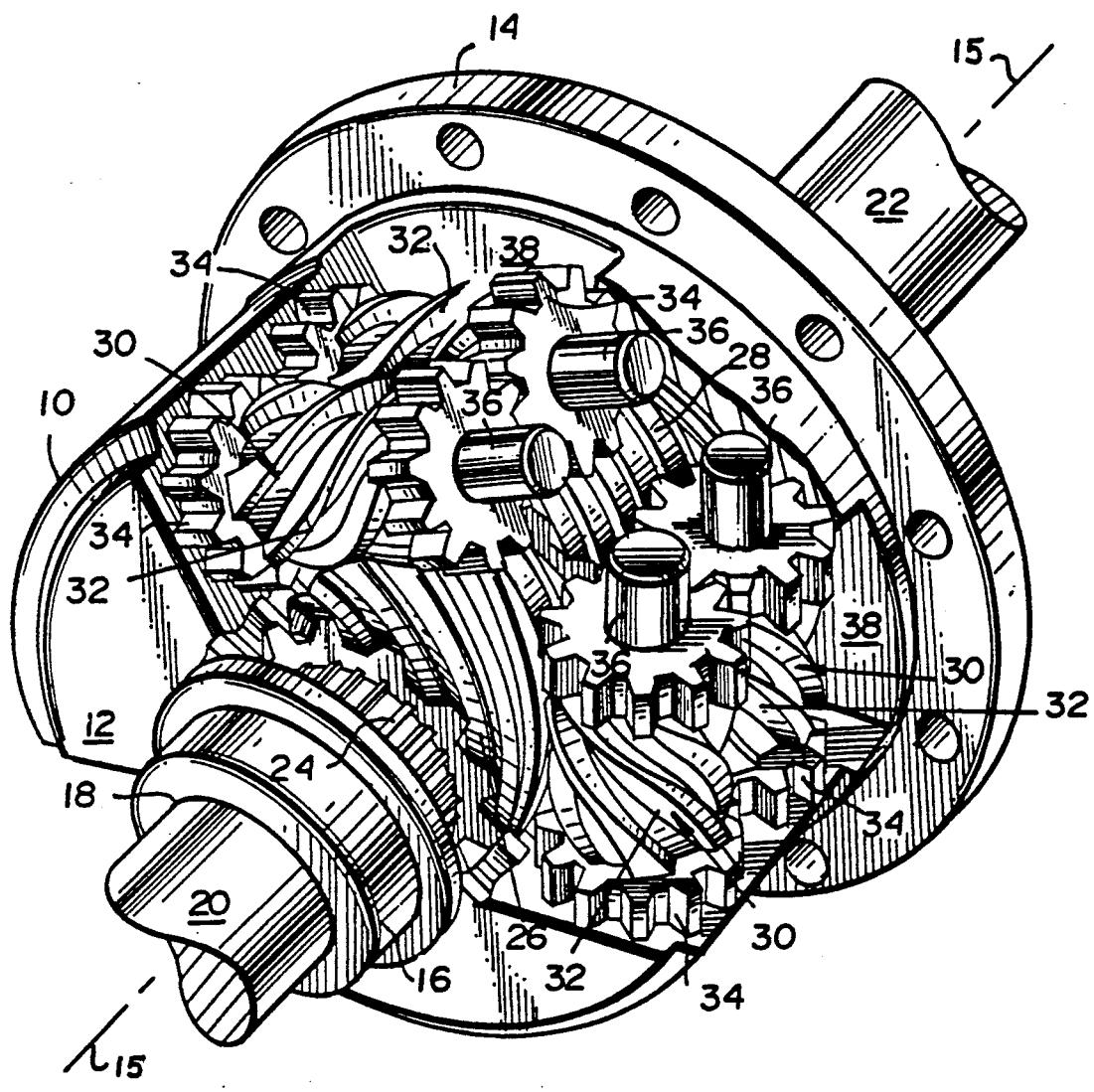
FIG. 1 is a perspective view of a known differential gear assembly with parts broken away in section to show the internal gear structure.

Referring to FIG. 1, a known differential gear assembly generally similar to the differential gear assembly of this invention includes a differential gear housing 10 which includes an end cap 12 at one end and a flange 14 at the other end. The flange 14 is adapted to mount a ring gear (not shown) for receiving power input from the drive train of a vehicle in a conventional manner. The differential gear housing 10 also includes a pair of spaced apart trunnions 16 (only one of which is shown) which are adapted to receive bearings by which the differential housing is rotatively mounted inside a conventional axle housing.

Trunnions 16 receive in respective bores 18 axle ends 20 and 22 which extend into engagement with the gear complex inside the main body portion of the housing. In particular, axle shaft ends 20 and 22 include external splines 24 which engage mating splines of side gears 26 and 28, respectively. The side gears are known to be of the worm or helical gear type.

Each side gear 26 or 28 meshes with three combination gears 30 which are arranged at 120° (degree) intervals about the periphery of the associated side gear, and are arranged generally tangent to, and in engagement with the pitch surface of the side gear. It is understood with reference to FIG. 1, that only two of the three combination gears associated with each side gear 26 or 28 are shown. Each of these combination gears is formed with a middle portion which may be defined by an hourglass worm wheel portion 32 and integral end portions which may be defined by spur gear portions 34. Since it would also be possible to substitute helical gearing for either the worm wheel portion or spur gear portions, the terms worm wheel and spur gear will be used hereinafter only to distinguish combination gear portions from each other and are not intended to be limiting as to gear type.

Each side gear meshes with the worm wheel portions 32 of three associated combination gears 30. The spur gear portions 34 of each combination gear associated with one side gear mesh with the spur gear portions of adjacent combination gears associated with the other of the two side gears. It is this arrangement, sometimes termed a "crossed-axis compound planetary gear complex" which transfers and divides torque between axle shaft ends 20 and 22.

Each combination gear 30 is mounted for rotation about a shaft 36, the ends of which extend beyond the gear and serve to mount the gear within the main body portion of the gear housing 10. Shafts 36 also define respective axes of rotation for the combination gears which extend substantially perpendicular to the common axis of rotation 15 of the side gears and axle ends. Since each of the three combination gears 30 associated with one side gear 26 or 28 is paired with a combination gear associated with the other side gear, the gear housing 10 is formed with three peripherally arranged "windows" or slots 38 extending inwardly from the periphery of the housing, each window or slot 38 receiving and mounting one pair of combination gears.

Each pair of combination gears 30 received in respective windows 38 formed in the housing at least partially defines a separate gear train for operatively connecting side gears 26 and 28 which are rotatively coupled to respective axle ends 20 and 22. It may be understood from the above description of the differential gear assembly of FIG. 1 that three separate gear trains are defined for operatively connecting the side gears, each train being at least partially defined by a combination gear pair received in one of the three windows 38 formed in gear housing 10.

Figure 2:
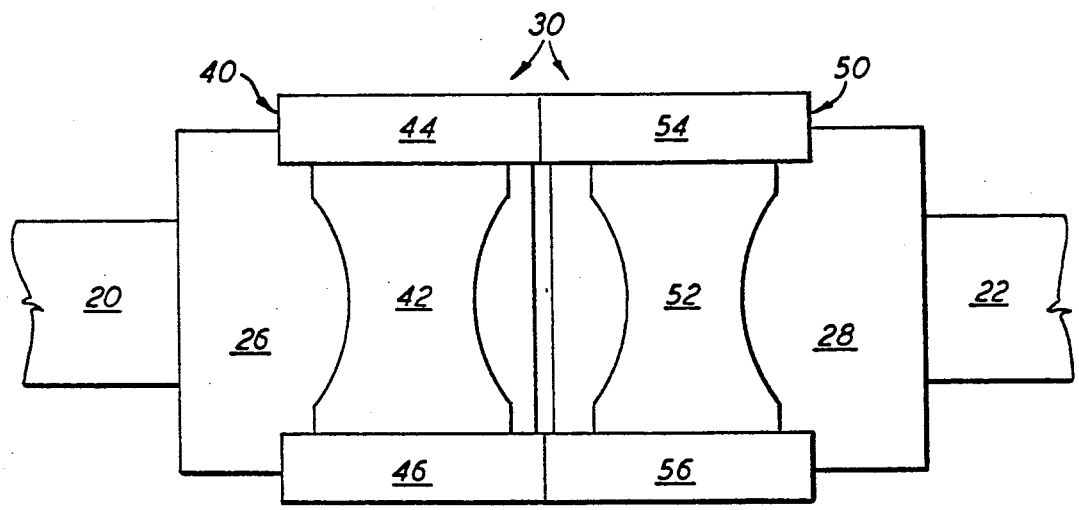
FIG. 2 is a schematic depiction of one of a plurality of gear trains for operatively connecting side gears within the differential.

One of these gear trains is depicted schematically in FIG. 2 wherein certain elements in common with the prior art gear assembly shown in FIG. 1 are designated by like reference numerals. Either axle shaft end 20 or 22 may be considered as input to the illustrated gear train depending upon the direction of power input to the gear housing and the relative directions of rotation of the axle ends with respect to the gear housing. For example, in vehicle turning situations under power from a vehicle's engine the axle associated with the inside drive wheel in a turn may be considered as "input" to the differential gear train and the axle associated with the outside drive wheel may be considered as "output" of the train. In this context, the terms input and output refer only to transfers of torque between drive axles and are not related to torque transfers between the gear housing and the drive axles, collectively.

Thus, in one direction of turn (e.g., left turn) left axle end 20 may be considered as input to the illustrated gear train. Left side gear 26 is rotatively coupled to axle end 20 and in mesh with one member 40 of a pair of combination gears 30. Specifically, side gear 26 is in mesh with worm wheel portion 42 of combination gear member 40. Rotation is transmitted from the one member 40 to the other combination gear member 50 through the meshing of paired spur gears 44, 54 and 46, 56, respectively. Spur gears 44 and 46 are mounted concentrically in fixed rotational positions with respect to worm wheel portion 42 of combination gear member 40, and spur gears 54 and 56 are similarly mounted with respect to worm wheel portion 52 of the other combination gear member 50. Worm wheel portion 52 rotates together with concentric spur portions 54 and 56 and transmits rotation to right side gear 28 in an opposite direction with respect to the rotation of left side gear 26. The exemplary gear train terminates with right axle end 22 which is rotated by side gear 28.

It may be appreciated that once the gear train has been assembled, the relative positions of the side gears are related by this gear train interconnecting them. Rotation of either side gear results in an equal amount but opposite direction of rotation of the other side gear. Additional gear trains for interconnecting the side gears must be designed to preserve the relative positions of the side gears established by the first assembled train. If the additional gear trains are not designed to interconnect side gears in the same relative positions established by the first train then either the additional trains will not fit into mesh, or at the least, will not transmit equal loads.

This situation is complicated by positioning requirements of the additional gear trains at angular intervals about the periphery of the side gears. For example, if the differential gear assembly includes three pairs of combination gears (i.e., three gear trains), the associated gear trains may be positioned at 120° intervals about the periphery of the side gears. These intervals, however, do not correspond to rotated positions of the first gear train through 120° of rotation (i.e., positions corresponding to the established rotational relationship between side gears) because rotation of the gear train requires equal amounts but opposite directions of relative side gear rotation. Accordingly, any differences between the tooth positions of the side gears at 120° intervals about their peripheries and the tooth positions of the side gears at increments of 120° of rotation in opposite directions must be accounted for by the design and arrangement of the additional gear trains.

Considering, for example, two side gears, each having eleven teeth, which are to be interconnected by three pairs of combination gears spaced evenly at 120° intervals about their periphery, each 120° interval covers the space of three and two-thirds side gear teeth. Accordingly, once a first gear train (i.e., combination gear pair) is fit into mesh with the two side gears, the ends of additional gear trains (i.e., additional combination gear pairs) must be fit into mesh at spacing increments of three and two-thirds side gear teeth with respect to the positions of the ends of the first gear train. However, if the additional gear trains are similarly designed, the additional trains must assume positions which are equivalent to equal but opposite directions of side gear rotation (i.e., as if the first gear train were to be rotated by such a particular amount). Thus, the first gear train requires similarly designed gear trains to be fit into mesh at increments corresponding to three and two-thirds side gear teeth measured in opposite directions on the side gears (e.g., plus three and two-thirds teeth about one side gear and minus three and two-thirds teeth about the other side gear), but as noted above, it is possible to assemble additional gear trains only at discreet intervals (e.g., 120°) in the same direction of rotation about both side gears (e.g., plus three and two-thirds or minus three and two-thirds teeth of rotation about both side gears).

Since the relative positions of gear teeth repeat at intervals of one circular pitch (i.e., the space from one tooth to the next) about the circumference of the gears, only the fractional portion of the pitch spacing measure about the side gears distinguishes tooth position. For example, only the two-thirds tooth portion of the three and two-thirds tooth separation between gear trains actually defines a different circumferential tooth position relative to evenly spaced gear teeth. However, spacing positions of plus two-thirds pitch and minus two-thirds pitch represent different tooth positions. A tooth position of minus two-thirds pitch actually corresponds to a tooth position of plus one-third pitch. Thus, in accordance with the present example, the end of a second gear train would be expected to mesh with one of the side gears at a plus one-third pitch position, but only a plus two-thirds pitch position is available to that end of the train. If the second gear train is to be fit into mesh with the side gears then it is necessary for the respective end positions of the additional gear train to be adjusted to account for this pitch difference.

This may be accomplished by indexing one combination gear relative to the other of a pair through the space of one or more spur gear teeth until the fractional portion of such indexing measured in worm wheel teeth is equal to the required one-third pitch difference. Such indexing involves removing the spur portions of a pair of combination gears from mesh, rotating one combination gear relative to the other and replacing the gears into a different spur mesh. In certain known designs, no more than one relative rotational position between spur portions may be effective for this purpose. Other positions may only approximate the required relationship between teeth of paired worm wheel portions and result in one of the gear trains being slightly advanced or retarded with respect to the others, thereby transmitting a disproportionate amount of load between side gears.

It is an important feature of the present invention that the number of index positions between combination gear pairs which are effective for positioning the combination gear pairs into mesh with the side gears is greatly increased and that such positions are easily recognizable without the aid of special timing marks. According to the present invention, the number of teeth in the spur portions of the combination gears is made an integer multiple of the number of teeth in the worm wheel portions of the same combination gears.

Figure 3:
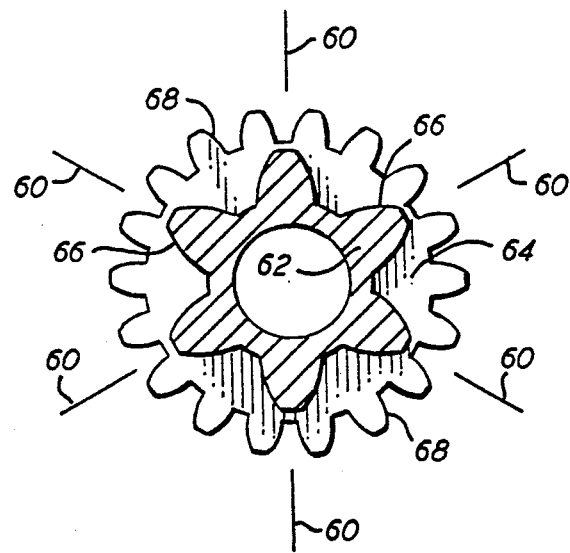
FIG. 3 is an axial view in cross section of a combination gear depicting a worm wheel and one spur portion of the gear designed in accordance with the present invention.

This relationship may be seen by way of example in FIG. 3. A schematic cross sectional view along the axis of a combination gear is shown including worm wheel portion 62 and spur portion 64. Worm wheel portion 62 includes teeth 66 which are six in number and spur portion 64 includes teeth 68 which number eighteen. It may be noted that the spur portion includes three times the number of teeth of the worm wheel portion. This exemplary relationship may be generalized by the following equation:

$$n_s = n * k \qquad (1)$$

where "$n_s$" is equal to the number of spur teeth (e.g., eighteen), "$n$" is equal to the number of worm wheel teeth (e.g., six) and "$k$" is an integer multiple (e.g., three).

Radial lines 60 of FIG. 3 divide the circumference of worm wheel portion 62 into one pitch intervals. It may now be appreciated that the integer multiple relationship between spur gear and worm wheel tooth numbers results in a pattern of spur tooth positions which is repeated in each worm wheel portion pitch interval demarcated by radial lines 60. Since there are exactly three times the number of worm wheel teeth in the spur gear, rotation of the illustrated combination gear through the space of one spur gear tooth indexes the worm wheel portion through one-third pitch (i.e., one-third worm wheel tooth).

Figure 4:
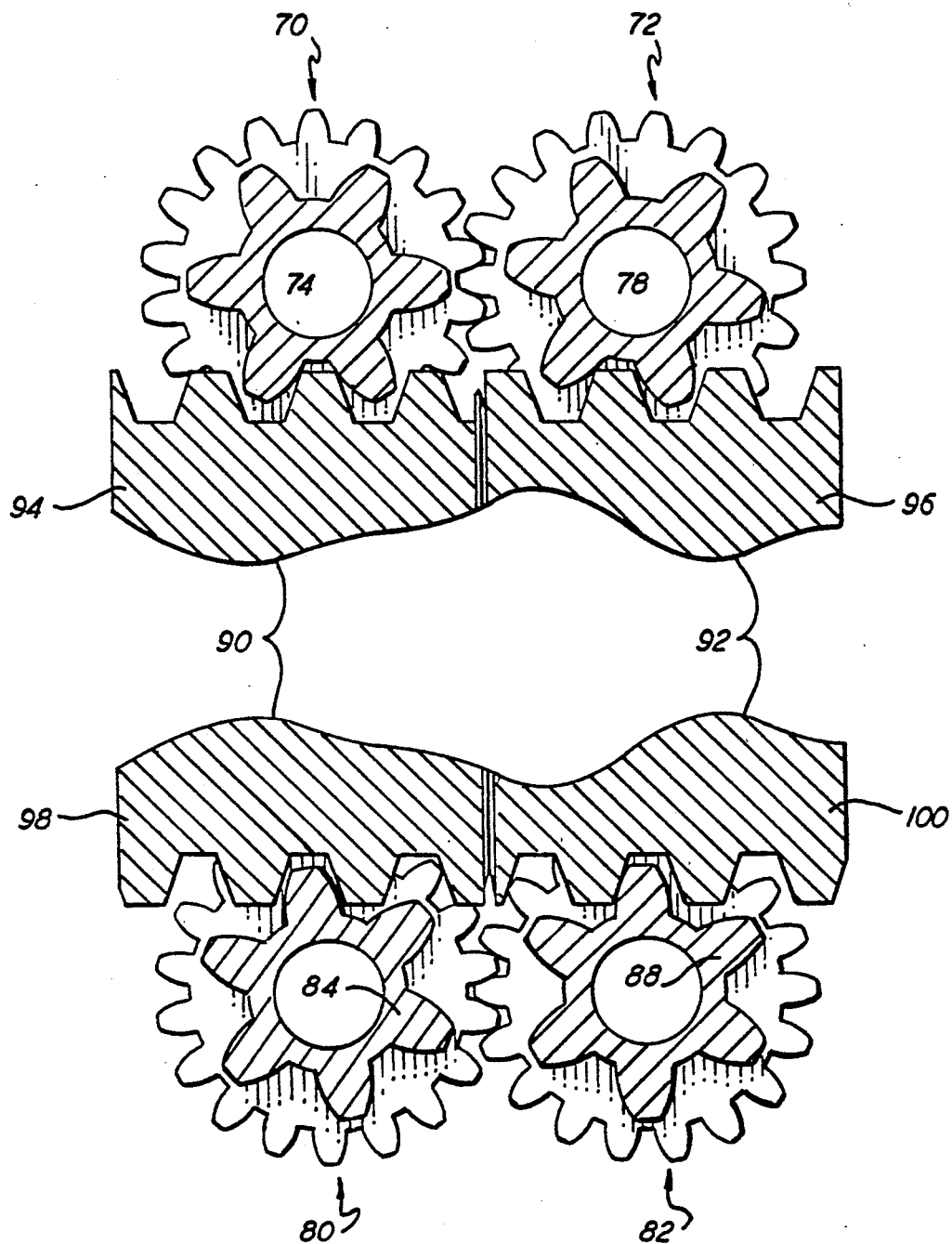
FIG. 4 illustrates the cross sectional combination gear design of FIG. 3 used in two combination gear pairs in mesh with the same side gears at different positions (shown in broken away sections) about the periphery of the side gears.

FIG. 4 schematically depicts a relationship of two pairs of combination gears connecting the same pair of side gears at intervals of 120° about the periphery of the side gears. The side gears are shown in broken-away cross sections to permit a comparison between tooth positions of combination gear pairs in a single plane where in reality planes containing the cross sectional areas of each pair of combination gears are oriented 120° apart. Also, the combination gears include tooth numbers equal to those of the previous example, and the side gears include eleven teeth.

Combination gears 70 and 72 represent a first gear train for connecting side gears 90 and 92. The first gear train establishes a rotational relationship between the side gears which is in part defined by the rotational positions of teeth of worm wheel portions 74 and 78 of combination gears 70 and 72, respectively. This relationship is maintained by equal but opposite directions of rotation of side gears 90 and 92.

Combination gears 80 and 82 represent a second gear train which is assembled between side gears at an interval of 120° of rotation about the periphery of the side gears. In this new position, the side gear teeth are presented to the combination gear pair in positions representing the rotation of both side gears by three and two-thirds pitch in the same direction. Thus, the cross sectional tooth positions between broken away portions 94, 96 and 98, 100 of both side gears are shifted relative to each other by two-thirds pitch. However, if either of the enmeshed combination gears 80 and 82 is rotated through three and two-thirds pitch to match the new rotated positions of the side gears, then the other combination gear would rotate an equal amount in the opposite direction, resulting in a pitch difference of one-third between the other combination gear and the side gear to which it is intended to be enmeshed.

Accordingly, combination gears 80 and 82 are assembled into mesh with side gears 90 and 92 by first removing one of the combination gears from mesh with the other and indexing the gear by one spur tooth relative to the other to adjust the relative tooth positions of worm wheel portions 84 and 88 through the distance of one-third pitch. It may now be appreciated with respect to the illustration of FIG. 3 that the integer multiple relationship between spur teeth and worm wheel teeth of each combination gear permits a similar one-third pitch adjustment at each pitch interval of the worm wheel portions of the combination gears. In other words, it is now possible in accordance with the present invention to fit any one of the worm wheel teeth of either combination gear of an additional gear train into mesh with the side gears. These positions are easily recognizable since the remaining positions between spur meshes of the combination gears result in worm tooth positions which are in error by at least one-third pitch.

It is also an important feature of the present invention that the integer multiple of tooth numbers between the spur and worm wheel portions of the combination gears is selected so that the fractional pitch adjustment between worm wheel portions which may be effected by the spur gear index corresponds to the fractional difference required to enmesh additional gear trains at intervals about the periphery of the side gears. This relationship of side gear teeth, numbers of gear trains and the previously identified integer multiple k is summarized in the following mathematical equation:

$$I = \frac{2(N * k)}{W} \quad (2)$$

where "N" is equal to the number of side gear teeth, "W" is equal to the number of combination gear pairs (gear trains) and "I" is equal to an integer value.

The term of side gear teeth divided by the number of gear trains (N/W) in the above equation represents the number of side gear teeth between gear trains, the fractional remainder of which represents the pitch difference between side gear teeth presented to adjacent gear trains. Ordinarily, the integer multiple k is selected so that the spur index measured in units of worm wheel pitch is equal to the lowest whole denominator of the fractional pitch difference between gear trains.

For example, if N represents eleven side gear teeth and W represents three gear trains, then the lowest whole denominator of the fraction "N/W" is three. Accordingly, equation (2) may be satisfied by an integer multiple k equal to three.

However, in accordance with the present invention, the right side of equation (2) is also multiplied by a factor of two. This factor expands the possibilities for selecting values for integer multiple k which satisfy the equation by including within the solution multiples of pitch difference between gear trains which are divisible by one-half pitch. Both positive and negative gear rotations through one-half pitch represent equivalent tooth positions. Accordingly, such intervals do not require combination gear pairs of additional gear trains to be indexed relative to the first gear train to account for the relationship established between side gears by the first gear train.

Generally, it is also preferred to design the side gears and meshing worm wheel portions of the combination gears such that the number of teeth in the side gears is not evenly divisible by the number of worm wheel teeth. This assures that each worm wheel tooth will mesh with a different side gear tooth during succeeding rotations of the side gear.

The following table lists a series of designs which are considered particularly suitable for the practice of the present invention. Each design includes three combination gear pairs which are positioned at 120° intervals about the periphery of the side gears.

| n | N | $n_s$ | k |
|---|----|----|---|
| 6 | 11 | 18 | 3 |
| 7 | 11 | 21 | 3 |
| 7 | 12 | 14 | 2 |
| 7 | 12 | 21 | 3 |
| 6 | 13 | 18 | 3 |
| 7 | 13 | 21 | 3 |

It is also possible to move the respective axes of the combination gear sets which mesh with the same side gear out of a single plane of engagement with the side gear. In other words, combination gear pairs may be shifted along the axial length of the side gears relative to each other. This enables each combination gear pair to engage the two side gears at a different position along side gear length, and thereby distribute contact wear over a larger area of the side gears. Such shifts in contact position along the length of the side gears may be measured in units of side gear axial pitch (i.e., the space from one tooth to the next measured along the gear axis).

These shifts also have the effect of changing the circular pitch separation between combination gear pairs by amounts corresponding to the units of axial pitch separations along the side gears. For example, a shift between combination gear pairs of one-third axial pitch results in a one-third circular pitch change in the circumferential position of the combination gear pairs about the periphery of the side gears.

Figure 5:
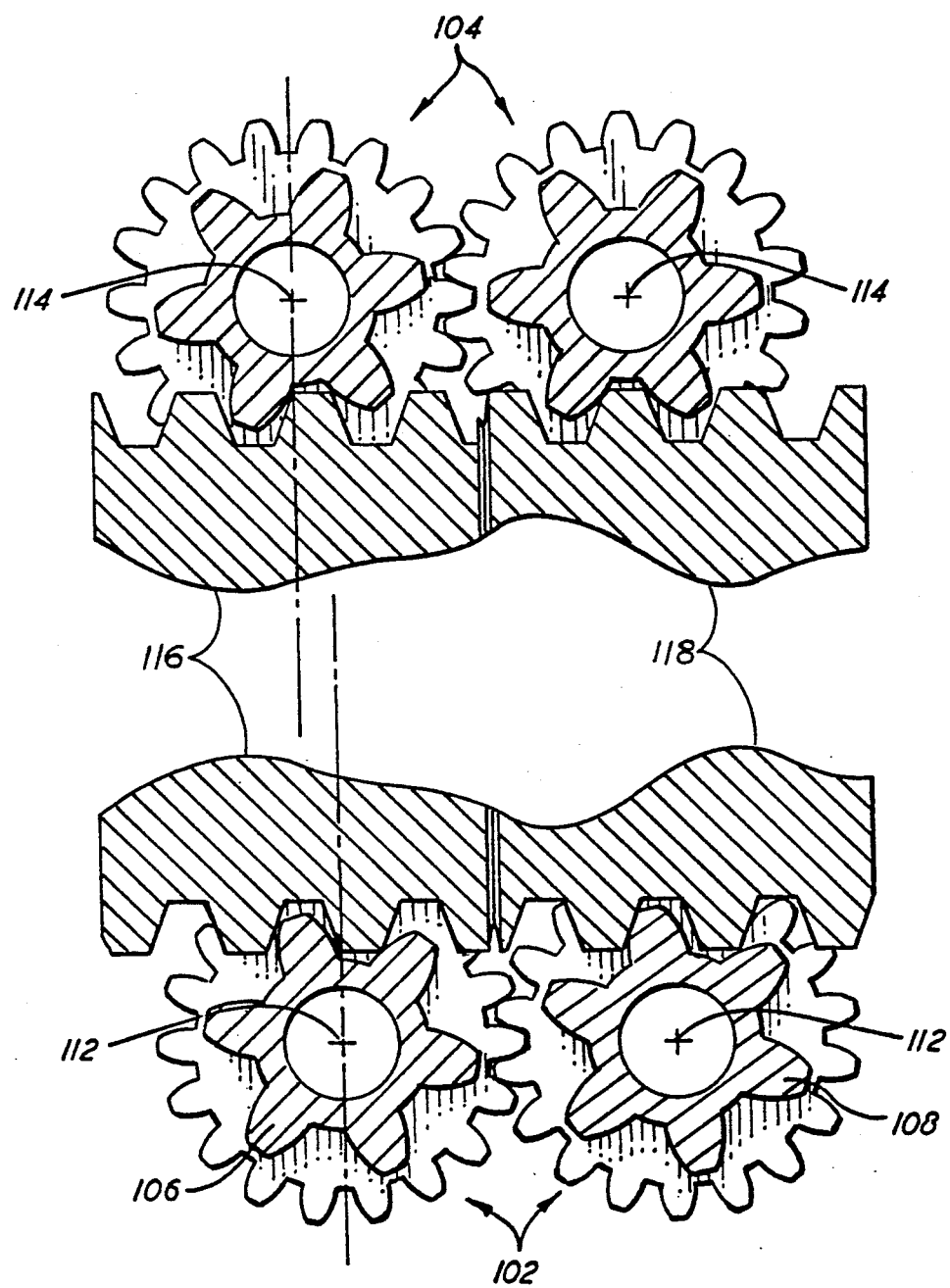
FIG. 5 is the same type of view as FIG. 4, however, the two pairs of combination gears are shifted relative to each other along the length of the side gears.

FIG. 5 is constructed similarly to FIG. 4 except that axes 114 combination gear pair 104 and axes 112 of combination gear pair 102 are shifted relative to each other along side gears 116 and 118 by approximately one-third axial pitch. This also has the effect of changing the circular pitch positions of the side gears presented to worm wheel portions 106 and 108 by an additional one-third pitch over that which results from positioning the combination gear pairs at a 120° interval about the side gears.

Accordingly, if pairs of combination gears are shifted along the length of the side gears relative to each other, equation (2) must be modified to account for the additional pitch difference between gear pairs as follows:

$$I_2 = \frac{2(N \cdot k)}{W} + 2(N_a \cdot k) \qquad (3)$$

where "$N_a$" is the shift in units of axial pitch between adjacent gear trains and "$I_2$" is an integer value.

Axial shift between side gears in units of $N_a$ may be used to compensate for particular combinations of side gear tooth numbers N and gear trains W which would otherwise require undesirably large values for integer multiple k to satisfy equation (3). Ordinarily, it is preferred to limit integer multiple k to three or less to provide the spur portions of the combination gears with sufficient tooth thickness to carry expected loads.

Figure 6:
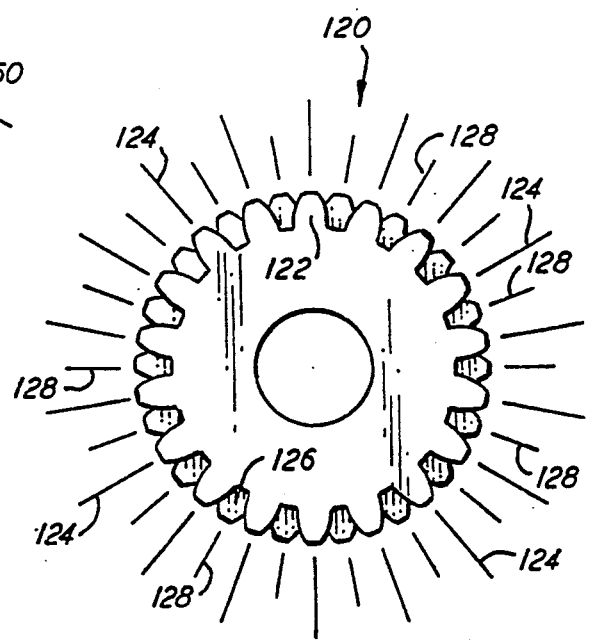
FIG. 6 is end view of a combination gear showing one-half pitch indexing between spur gear portions of the gear; and, FIG. 7 is a greatly enlarged end view of a combination gear depicting the outline of gear teeth in the worm wheel portion and both spur portions as they would appear in the respective transverse planes of each gear portion.

FIG. 6 is an end view of a combination gear pair showing another important timing relationship of the present invention between spur portions of the same combination gear. The illustrated combination gear 120 includes first spur portion 122 which is indexed relative to second spur portion 126 so that one or the other spur portions remains firmly in mesh with spur portions of the other member of a combination gear pair in all rotational positions. Radial lines 124 and 128 respectively divide spur portions 122 and 126 into even circumferential pitch intervals. Since the radial lines reference corresponding circumferential positions on both spur portions, angular separations between radial lines 124 and 128 represent the rotational index of one spur portion relative to the other.

In the case of combination gear 120, the rotational index between first and second spur portions is equal to one-half circular spur pitch. It may be noted in connection with earlier statements made concerning one-half pitch that the relative positions between spur portions are identical for one-half pitch indexes in either direction of relative rotation between spur portions. Accordingly, it is possible to fit identically designed combination gear members of a pair having one-half pitch indexing between spur portions into mesh with each other. This enables the same design of combination gear to be used in both sets of combination gears associated with the separate side gears.

However, although an identical design of combination gear may now be used throughout the differential assembly, it should be noted that unless a special relationship is established between the angular positions of the worm wheel and spur gear teeth, it would be necessary to maintain the same orientation of first and second spur portions of each combination gear mounted about the periphery of the same side gear. This is because, when a combination gear is inverted, the opposite flanks of the worm wheel and spur teeth are brought into mesh, and the relative angular relationship between the operative flanks of the worm wheel teeth and the spur teeth of one spur portion may differ from the relative angular relationship between the opposite flanks of the worm wheel teeth and the spur teeth of the other spur portion.

Figure 7:
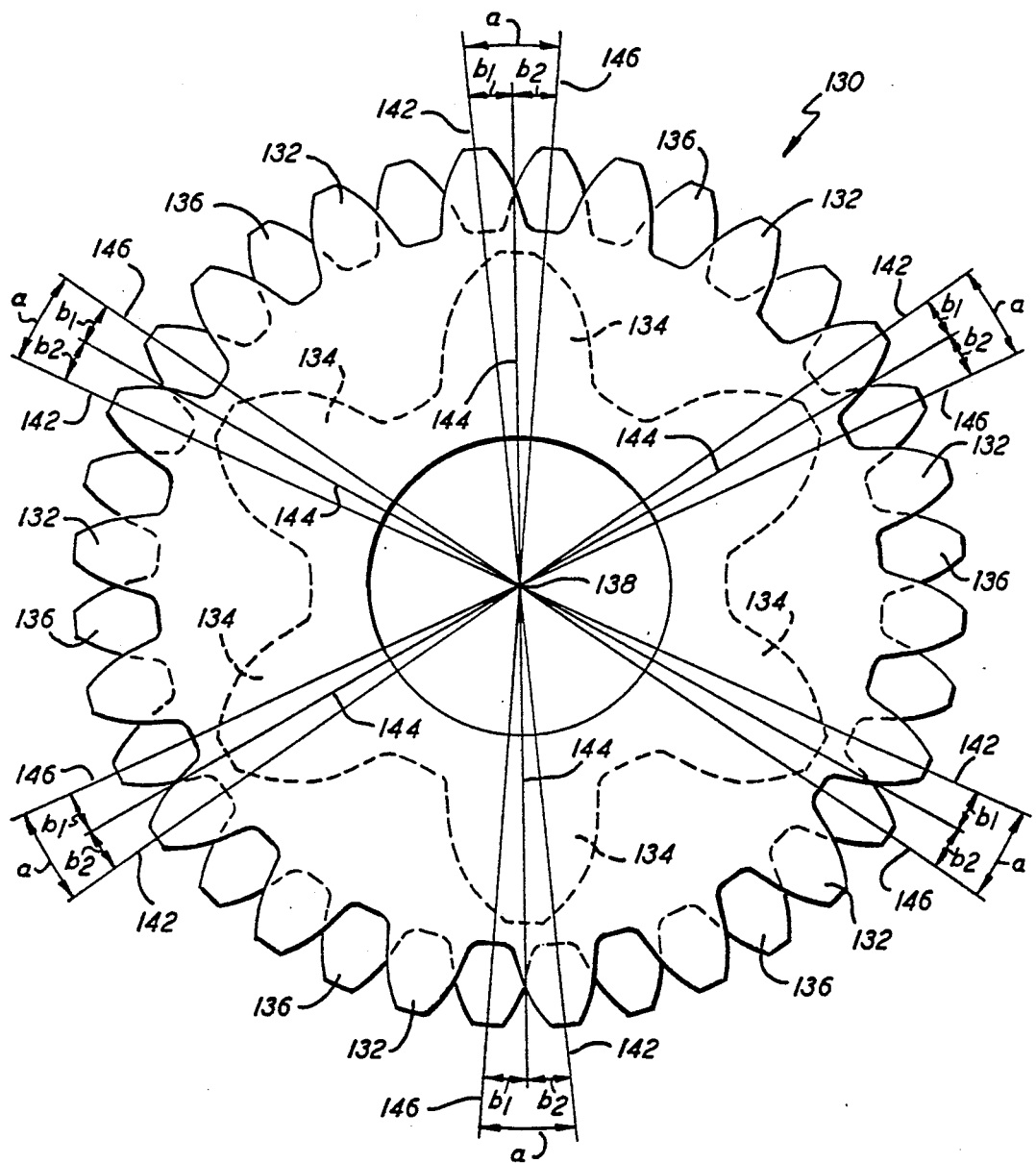

Thus, if a combination gear is to be inverted without disturbing its timed relationship with the other combination gears in mesh with the same side gear, the angular relationships between the worm wheel portion and each of the spur portions must be considered. FIG. 7 is a greatly enlarged axial view of combination gear 130 showing the teeth of both spur portions in a particular angular relationship with the teeth of a worm wheel portion. Spur gear teeth 132 of the first spur gear portion, worm wheel teeth 134 of the worm wheel portion and spur teeth 136 of the second spur portion are each depicted in outline as they are understood to appear in their respective transverse planes. However, worm wheel teeth 134 and portions of second spur teeth 136 which are hidden by the first spur gear portion are outlined in broken lines. Also, it is important to note that the transverse plane in which the the worm wheel teeth are depicted is located midway of worm wheel tooth length and, with respect to the operative mounting position of the combination gear, includes the side gear axis.

Radial construction lines 144, 142, and 146 are drawn though the respective centers of worm wheel teeth 134 and certain of the first spur gear teeth 132 and second spur gear teeth 136 of combination gear 130 to reference the relative angular positions of the gear teeth about combination gear axis 138. More particularly, the radial lines are understood to intersect the midpoint of transverse circular thickness of the outlined gear teeth. It is important to note that such midpoints locate angular positions about the gears' respective circumferences at which tooth profiles on either side are mirror symmetrical. Of course, the same reference characteristic could be obtained by selecting the midpoints of circular tooth space width.

In accordance with the present invention, the angular positions of the first and second spur teeth are adjusted with respect to the worm wheel teeth so that radial lines 144 of worm wheel teeth 134 bisect the angular index "a" between radial lines 142 and 146 of the first and second spur teeth. The circumferential index between the first and second spur teeth in the illustrated combination gear is one-half spur pitch. Accordingly, the worm wheel teeth are indexed one-quarter spur pitch through equal angles $b_1$ and $b_2$ with respect to the spur gear teeth at either end of the combination gear.

It may now be understood that this adjustment establishes equal angular relationships between opposite flanks in the respective combination gear and, upon inversion of the combination gear, preserves the same timing relationship between the rotational position of the worm wheel portion and each of the spur portions.

This new design of combination gear may be mounted in the differential gear assembly in either desired orientation of the first and second spur portions with respect to the worm wheel portion.

INDUSTRIAL APPLICABILITY

The special relationships between tooth numbers and positions described above for multiple gear train differentials permit greatly simplified methods of assembly. For example, the present invention provides for (a) re-engaging any of the worm wheel teeth of a combination gear into mesh with a side gear, (b) mounting the combination gears in any prescribed sequence, (c) using the same combination gear design throughout the assembly and (d) mounting the combination gears in either orientation of their first and second spur portions with respect to their worm wheel portions.

The invention also holds a number of benefits for automating manufacture and assembly of the gearing components. Perhaps the most important benefits are associated with the elimination of the special timing marks which have been used to identify particular orientations of the combination gears. For example, timing marks are ordinarily established after the spur teeth are formed and just prior to a hobbing operation for forming the worm wheel teeth. After the hob becomes worn during use, known procedures call for the hob to be shifted along its axis to expose new cutting edges by increments of one axial worm wheel pitch. For example, U.S. Pat. No. 3,748,962 (HILKERT et al) discloses a type of hob shifting mechanism appropriate for this purpose and is hereby incorporated by reference to the extent necessary to provide details this well known practice.

However, hob shifts in one worm wheel pitch increments which have been used to preserve the established orientation of the timing mark may exceed the the amount required to expose fresh cutting edges. Accordingly, not all of the working edges of the hob are used up equally, and this diminishes the effective life of the hob.

The integer multiple relationship between worm wheel and spur teeth in the present invention eliminates the need for such timing marks and permits hob shifts at smaller distances by increments of axial spur gear pitch. At "k" equal to three, for instance, two times the number of positions of hob shift are available for use along hob length. This additional freedom may extend hob life to produce more parts between hob sharpenings and eventual replacements.

Benefits related to automated assembly are also apparent from the elimination of the timing marks. Previously it was necessary to locate the timing mark on each combination gear and to rotate the combination gear by a prescribed amount according to its intended position before mounting the gear within the assembly. The difficulty of this task has discouraged use of automated assembly techniques such as robotics in favor of outmoded manual procedures. However, the many new assembly freedoms associated with the present invention, including the elimination of timing marks, are believed to make the assembly of crossed-axis gear complexes more compatible with automation.

Although the present invention has been described with particular reference to the usual gearing configuration of crossed-axis gear complexes, other configurations of differential gearing may also benefit from the timing improvements contemplated in the present invention. For example, the timing considerations disclosed with respect to the usual gearing configuration also apply to multiple gear train arrangements in which intermediate idler gears are placed between the combination gears to permit access to the center of the differential. Alternatively, it is possible to include different size side gears to vary speed ratio between drive axles. In that case, the teaching of the present invention is applied separately to gear complexes associated with each side gear. These and other modifications and rearrangements of the elements are possible within the spirit and scope of the claims which follow.

I claim:

1. A differential gear assembly comprising:
    a rotatable gear housing (10) having means (16) for receiving axle ends (20 and 22);
    side gears (26 and 28) disposed within said housing (10) for respective rotation with said axle ends (20 and 22) about a common axis (15);
    pairs of combination gears (30, 120, or 130) rotatable about respective axes (112 and 114, or 138) that extend perpendicular to said common axis (15);
    each of said combination gears (30, 120, or 130) including a middle gear portion (32) with end gear portions (34) formed at either end thereof;
    the middle gear portion (42) of one member (40) of each combination gear pair in mesh with one of said side gears (26), the middle gear portion (52) of the other member (50) of each combination gear pair in mesh with the other side gear (28), and the end gear portions (44 and 46) of said one combination gear (40) of each pair operatively connected to the end gear portions (54 and 56) of said other members (50) of each pair;
    each of said pairs of combination gears (30, 120, or 130), in part, defining a separate gear train for operatively connecting said side gears (26 and 28); and
    said middle gear portion (32) of each combination gear (30, 120, or 130) including "n" number of teeth, said end gear portions (34) of each combination gear (30) including "$n_s$" number of teeth, and said "$n_a$" number of teeth of said end gear portions (34) being equal to an integer multiple "k" of said "n" number of teeth of said middle gear portion (32) in accordance with the following mathematical expression:

$$n_s = k^* n$$

wherein "k" is an integer greater than one.

2. A differential gear assembly comprising:
    a rotatable gear housing (10) having means (16) for receiving axle ends (20 and 22);
    side gears (26 and 28) disposed within said housing (10) for respective rotation with said axle ends (20 and 22) about a common axis (15);
    pairs of combination gears (30, 120, or 130) rotatable about respective axes (112 and 114, or 138) that extend perpendicular to said common axis (15);
    each of said combination gears (30, 120, or 130) including a middle gear portion (32) with end gear portions (34) formed at either end thereof;
    the middle gear portion (42) of one member (40) of each combination gear pair in mesh with one of said side gears (326), the middle gear portion (52) of the other member (50) of each combination gear pair in mesh with the other side gear (28), and the end gear portions (44 and 46) of said one combination gear (40) of each pair operatively connected to the end gear portions (54 and 56) of said other member (50) of each pair;

each of said pairs of combination gears (30, 120, or 130), in part, defining a separate gear train for operatively connecting said side gears (26 and 28); and said middle gear portion (32) of each combination gear (30, 120, or 130) including "n" number of teeth, said end gear portions (34) of each combination gear (30) including "$n_s$" number of teeth, and said "$n_s$" number of teeth of said end gear portions (34) being equal to an integer multiple "k" of said "n" number of teeth of said middle gear portion (32) in accordance with the following mathematical expression:

$$n_s = k*n$$

and further including "W" number of said separate gear trains and "N" number of teeth in each side gear (26 and 28) wherein a quotient of two times a quantity of said "N" number of teeth in each of said side gears (26 and 28) multiplied by said integer multiple "k" divided by said "W" number of said gear trains is equal to an integer value "I" in accordance with the following mathematical expression:

$$I = \frac{2(N*k)}{W}.$$

3. The differential gear assembly of claim 2 wherein said end gear portion (34) at either end of said middle gear portion (32) of said combination gears (30, 120, or 130) are defined by a first end gear portion (122) and a second end gear portion (126) in respectively fixed rotational positions with respect to said middle gear portion (32) of said combination gears (30, 120, or 130), and said first end gear portion (122) being relatively indexed by one-half circular pitch with respect to said second end gear portion (126).

4. The differential gear assembly of claim 3 wherein:
said respectively fixed rotational positions of said first (122) and second (126) end gear portions (34) with respect to said middle gear portion (32) of each combination gear (30, 120, or 130) being referenced by radial lines (144, 142, and 146) extending from said combination gear axis (138) and respectively intersecting the midpoint of transverse circular tooth thickness of each tooth (134, 132, and 136) in said middle gear portion (32) and said first (122) and second (126) end gear portions (34);

said radial lines (144) associated with middle gear teeth (134) in said middle gear portion (32) lying in a transverse plane of said middle gear portion (32) including said common axis (15) of said side gears (26 and 28);

said radial line (142 and 146) associated with end gear teeth (132 and 136) in said first (122) and second (126) end gear portions (34) lying in respective transverse planes of said first (122) and second (126) end gear portions (34);

said relative index between said first (122) and second (126) end gear portions (34) being further defined by angular measures (a) about said combination gear axis (138) between said radial lines (142) associated with end gear teeth (132) in said first end gear portion (122) and said radial lines (146) associated with adjacent end gear teeth (136) in said second end gear portion (126);

and said respectively fixed rotational positions of said first (122) and second (126) end gear portions (34) with respect to said middle gear portion (32) being further defined by said radial lines (144) associated with said middle gear teeth (134) in said middle gear portion (32) bisecting said angular measure (a) of said relative index between said first (122) and second (126) end gear portions (34) about said combination gear axis (138) and forming equal angles ($b_a$, $b_2$) with each of said radial lines (142 and 146) respectively associated with said end gear teeth (132) in said first end gear portion (122) and said adjacent end gear teeth (136) in said second end gear portion (126).

5. The differential gear assembly of claim 4 wherein the integer multiple "k" is equal to a lowest whole denominator of a fractional pitch difference between rotated positions of said separate gear trains.

6. The differential gear assembly of claim 5 wherein said integer multiple "k" is equal to three or less.

7. The differential gear assembly of claim 4 wherein the number of teeth in the side gears "N" is not evenly divisible by a number of middle gear teeth "n".

8. The differential gear assembly of claim 2 wherein:
said end gear portions (34) at either end of said middle gear portion (32) of said combination gears (30, 120, or 130) are defined by a first end gear portion (122) and a second end gear portion (126) in respectively fixed rotational positions with respect to said middle gear portion (32) of said combination gears (30, 120, or 130);

said respectively fixed rotational positions of said first (122) and second (126) end gear portions (34) with respect to said middle gear portion (32) of each combination gear (30, 120, or 130) being referenced by radial lines (144, 142, and 146) extending from said combination gear axis (138) and respectively intersecting the midpoint of transverse circular tooth thickness of each tooth (134, 132, and 136) in said middle gear portion (32) and said first (122) and second (126) end gear portions (34);

said radial lines (144) associated with middle gear teeth (134) in said middle gear portion (32) lying in a transverse plane of said middle gear portion (32) including said common axis (15) of said side gears (26 and 28);

said radial line (142 and 146) associated with end gear teeth (132 and 136) in said first (122) and second (126) end gear portions (34) lying in respective transverse planes of said first (122) and second (126) end gear portions (34);

said relative index between said first end gear portion (122) and second end gear portion (126), being further defined by angular measures (a) about said combination gear axis (138) between said radial lines (142) associated with end gear teeth (132) in said first end gear portion (122) and said radial lines (146) associated with adjacent end gear teeth (136) in said second end gear portion (126);

and said respectively fixed rotational positions of said first (122) and second (126) end gear portions (34) with respect to said middle gear portion (32) being further defined by said radial lines (144) associated with said middle gear teeth (134) in said middle gear portion (32) bisecting said angular measure (a) of said relative index between said first (122) and second (126) end gear portions (34) about said combination gear axis (138) and forming equal angles (b₁, b₂) with each of said radial lines (142 and 146) respectively associated with said end gear teeth (132) in said first end gear portion (122) and said adjacent end gear teeth (136) in said second end gear portion (126).

9. The differential gear assembly of claim 8 wherein said middle gear portion (32) is indexed through equal angles (b₁ and b₂) with respect to each of said first (122) and second (126) end gear portions (34) corresponding to one-quarter circular pitch of said end gear portions.

10. A differential gear assembly comprising:
a rotatable gear housing (10) having means (16) for receiving axle ends (20 and 22);
side gears (26 and 28) disposed within said housing (10) for respective rotation with said axle ends (20 and 22) about a common axis (15);
pairs of combination gears (30, 120, or 130) rotatable about respective axes (112 and 114, or 138) that extend perpendicular to said common axis (15);
each of said combination gears (30, 120, or 130) including a middle gear portion (32) with end gear portions (34) formed at either end thereof;
the middle gear portion (42) of one member (40) of each combination gear pair in mesh with one of said side gears (26), the middle gear portion (52) of the other member (50) of each combination gear pair in mesh with the other side gear (28), and the end gear portions (44 and 46) of said one combination gear (40) of each pair operatively connected to the end gear portions (54 and 56) of said other member (50) of each pair;
each of said pairs of combination gears (30, 120, or 130), in part, defining a separate gear train for operatively connecting said side gears (26 and 28); and
said middle gear portion (32) of each combination gear (30, 120, or 130) including "n" number of teeth, said end gear portions (34) of each combination gear (30) including "$n_s$" number of teeth, and said "$n_s$" number of teeth of said end gear portions (34) being equal to an integer multiple "k" of said "n" number of teeth of said middle gear portion (32) in accordance with the following mathematical expression:

$$n_s = k * n$$

and further including "W" number of said separate gear trains and "N" number of teeth in each side gear (26 and 28), said pairs of combination gears (102 and 104) being shifted relative to each other along said common axis (15) of said side gears (26 and 28) by "$N_a$" units of side gear axial pitch wherein said "W" number of gear trains, said "N" number of side gear teeth, said "$N_a$" units of axial pitch, and said integer multiple "k" are related according to the following mathematical expression of integer value "I":

$$I = \frac{2(N * k)}{W} + 2(N_a * k).$$

11. The differential gear assembly of claim 10 wherein said end gear portions (34) at either end of said middle gear portion (32) of said combination gears (30, 120, or 130) are defined by a first end gear portion (122) and a second end gear portion (126) in respectively fixed rotational positions with respect to said middle gear portion (32) of said combination gears (30, 120, or 130), and said first end gear portions (122) being relatively indexed by one-half circular pitch with respect to said second end gear portions (126).

12. The differential gear assembly of claim 11 wherein:
said respectively fixed rotational positions of said first (122) and second (126) end gear portions (34) with respect to said middle gear portion (32) of each combination gear (30, 120 or 130) being referenced by radial lines 144, 142, and 146) extending from said combination gear axis (138) and respectively intersecting the midpoint of transverse circular tooth thickness of each tooth (134, 132, and 136) in said middle gear portion (32) and said first (122) and second (126) end gear portions (34);
said radial lines (144) associated with middle gear teeth (134) in said middle gear portion (32) lying in a transverse plane of said middle gear portion (32) including said common axis (15) of said side gears (26 and 28);
said radial lines (142 and 146) associated with end gear teeth (132 and 136) in said first (122) and second (126) end gear portions (34) lying in respective transverse planes of said first (122) and second (126) end gear portions (34);
said relative index between said first (122) and second (126) end gear portions (34) being further defined by angular measures (a) about said combination gear axis (138) between said radial lines (142) associated with end gear teeth (132) in said first end gear portion (122) and said radial lines (146) associated with adjacent end gear teeth (136) in said second end gear portion (126);
and said respectively fixed rotational positions of said first (122) and second (126) end gear portions (34) with respect to said middle gear portion (32) being further defined by said radial lines (144) associated with said middle gear teeth (134) in said middle gear portion (32) bisecting said angular measure (a) of said relative index between said first (122) and second (126) said end gear portions (34) about said combination gear axis (138) and forming equal angles (b₁, b₂) with each of said radial lines (142 and 146) respectively associated with said end gear teeth (132) in said first end gear portion (122) and said adjacent end gear teeth (136) in said second end gear portion (126).

13. The differential gear assembly of claim 12 wherein said middle gear portion (32) is indexed through equal angles (b₁ and b₂) with respect to each of said first (122) and second (126) end gear portions (34) corresponding to one-quarter circular pitch of said end gears.

14. The differential gear assembly of claim 13 wherein said integer multiple "k" is equal to three or less.

15. The differential gear assembly of claim 2 wherein the integer multiple "k" is equal to a lowest whole denominator of a fractional pitch difference between rotated positions of said separate gear trains.

16. The differential gear assembly of claim 15 wherein said integer multiple "k" is equal to three or less.

17. The differential gear assembly of claim 15 wherein the number of teeth in the side gears "N" is not evenly divisible by a number of middle gear teeth "n".

18. A method of assembling the differential gear assembly according to claim 2 including the steps of:

mounting said side gears (26 and 28) within the gear housing (10);

mounting one member (40) of each combination gear pair in mesh with one of said side gears (26) by positioning any one of said middle gear teeth (66) of said one member (40) in mesh with said one side gear (26); and mounting the other member (50) of each combination gear pair in mesh with said one member (40) and the other of said side gears (28) by indexing the other member (50) by no more than "k" end gear teeth relative to said one member (40) and by positioning any one of said middle gear teeth (66) of said other member (50) in mesh with said other side gear (28).

19. The method of assembling as recited in claim 18 wherein said end gear portions (34) at either end of said middle gear portion (32) of said combination gears (30, 120, or 130) are defined by a first end gear portion (122) and a second end gear portion (126) in respectively fixed rotational positions with respect to said middle gear portion (32) of said combination gears (30, 120, or 130), including the step of:

mounting one or more of said combination gears (30, 120, or 130) in mesh with said side gears (26 or 28) in positions at which the first (122) and second (126) end gear portions (34) of said one or more combination gears (30, 120, or 130) are inverted with respect to the first (122) and second (126) end gear portions (34) of at least one other combination gear (30, 120, or 130) in mesh with the same side gear (26 or 28).

20. The method of assembling as recited in claim 19 wherein said respectively fixed rotational positions of said first (122) and second (126) end gear portions (34) with respect to said middle gear portion (32) are further defined by said first (122) and second (126) end gear portions (34) being relatively indexed with respect to each other by one-half circular pitch of said end gears, including the step of:

mounting the same design of combination gear (30, 120, or 130) as defined by said respectively fixed rotational positions of said first (122) and second (126) end gear portions (34) with respect to said middle gear portion (32) in mesh with both of said side gears (26 and 28).

* * * * *